United States Patent
Lee

(10) Patent No.: US 8,756,866 B2
(45) Date of Patent: Jun. 24, 2014

(54) DOOR GLASS CLAMP DEVICE

(71) Applicant: Hyundai Motor Company, Seoul (KR)

(72) Inventor: Hong Min Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/685,512

(22) Filed: Nov. 26, 2012

(65) Prior Publication Data

US 2014/0086668 A1  Mar. 27, 2014

(30) Foreign Application Priority Data

Sep. 27, 2012  (KR) .......................... 10-2012-0107855

(51) Int. Cl.
*B60J 1/16* (2006.01)
(52) U.S. Cl.
USPC ............................................................. 49/375
(58) Field of Classification Search
USPC .................... 49/372, 374, 375, 348, 349, 352
See application file for complete search history.

(56) References Cited

U.S. PATENT DOCUMENTS

| | | | | |
|---|---|---|---|---|
| 5,692,273 A * | 12/1997 | Rodde | | 24/541 |
| 5,778,599 A * | 7/1998 | Saito | | 49/375 |
| 5,992,099 A * | 11/1999 | Thomas | | 49/375 |
| 6,330,764 B1 * | 12/2001 | Klosterman | | 49/375 |
| 6,729,073 B2 * | 5/2004 | Nicolai | | 49/375 |
| 2002/0017061 A1 * | 2/2002 | Nicolai | | 49/375 |
| 2004/0107645 A1 * | 6/2004 | Galliani | | 49/375 |
| 2007/0125000 A1 * | 6/2007 | Fenelon | | 49/349 |
| 2008/0222857 A1 | 9/2008 | Twork et al. | | |
| 2010/0043297 A1 * | 2/2010 | Barr et al. | | 49/375 |

FOREIGN PATENT DOCUMENTS

| | | |
|---|---|---|
| KR | 10-2008-0016075 A | 2/2008 |
| KR | 10-0918437 B1 | 9/2009 |
| KR | 20090118339 A | 11/2009 |

* cited by examiner

*Primary Examiner* — Katherine Mitchell
*Assistant Examiner* — Scott Denion
(74) *Attorney, Agent, or Firm* — Morgan, Lewis & Bockius LLP

(57) ABSTRACT

A door glass clamp device may include a clamp jointed to each of a pair of guide rails installed at both sides of a door, a first mounting member mounted to the clamp and provided with a coupled portion supporting a lower part of a glass, a second mounting member coupled to the coupled portion of the first mounting member and supporting the glass together with the first mounting part, a coupling member coupled to the coupled portion on the second mounting member and moving the second mounting member toward the first mounting part, and an adjusting member slidably provided between the first mounting member and the second mounting member to be moved therebetween, the adjusting member controlling the coupling member to be coupled or not to be coupled to the coupled portion.

8 Claims, 4 Drawing Sheets

DOOR GLASS CLAMP DEVICE

CROSS-REFERENCE TO RELATED APPLICATION

The present application claims priority to Korean Patent Application No. 10-2012-0107855, filed on Sep. 27, 2012 in the Korean Intellectual Property Office, the entire contents of which is incorporated herein for all purposes by this reference.

BACKGROUND OF THE INVENTION

1. Field of the Invention

The present invention relates to a door glass clamp device, and more particularly, to a door glass clamp device capable of preventing a mounting badness of a door glass.

2. Description of Related Art

In general, a door window regulator of an automobile is a device opening and closing an opening part provided in a door via a door glass.

The door window regulator of the automobile has been fixedly mounted with two rails on a module plate in a height direction of the automobile in the state in which the two rails are spaced apart from each other at a predetermined interval in a length direction of the automobile, wherein a carrier plate capable of mounting the door glass thereon is fitted into each rail so as to be guided and moved along the rail and the carrier plate is connected to a driving motor via a cable.

The carrier plate includes a glass clamp to which the door glass may be fitted and mounted and a rail mounting part fitted so as to be guided and moved to the rail.

However, in the structure of the carrier plate according to the prior art, when an insertion of the glass is not complete, the glass is mounted at the left side and right side clamps, while being inclined, to cause assembly badness, whereby the noise of wind is introduced after the glass is closed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a door glass clamp device capable of preventing an assembly badness of a glass by including the glass so as not to be mounted when the glass is inserted into left side and right side glass clamps while being inclined.

In an aspect of the present invention, a door glass clamp device may include a clamp jointed to each of a pair of guide rails installed at both sides of a door, a first mounting member mounted to the clamp and provided with a coupled portion supporting a lower part of a glass, a second mounting member coupled to the coupled portion of the first mounting member and supporting the glass together with the first mounting part, a coupling member coupled to the coupled portion on the second mounting member and moving the second mounting member toward the first mounting part, and an adjusting member slidably provided between the first mounting member and the second mounting member to be moved therebetween, the adjusting member controlling the coupling member to be coupled or not to be coupled to the coupled portion.

The coupling member is a nut.

The adjusting member may include a pressed part extended beyond a catching portion of the first mounting member to be pressed by the glass, and a guide projection connected to the pressed part and elastically biased toward the coupled portion by an elastic member.

The guide projection is protruded at a lower one side of the coupled portion through a guide hole formed in the second mounting member and allows the coupling member to be coupled to the coupled portion while downwardly moving by the pressed part so as to make the guide projection spaced away from the coupled portion at the time the pressed part of the adjusting member is pressed by the glass.

The first mounting member may include a mounting part mounted at the clamp, a catching portion supporting a lower part of the glass, and the coupled portion having a thread formed thereon, wherein the second mounting member may include a coupling hole into which the coupled portion of the first mounting member is inserted so that the first mounting member supports front and rear surfaces of the glass together with the second mounting part.

The elastic member is provided between the guide projection of the adjusting member and a fixing part formed at the first mounting part.

The lower part of the glass insertedly supported between the first mounting member and the second mounting member with a buffering part.

A pressed part of the adjusting member is protruded through a lower part of the buffering part and selectively pressed by the glass inserted into the buffering part.

An upper side of the pressed part of the adjusting member is provided with a catching jaw to be caught by the lower part of the buffering part when the lower part of the buffering part is pressed by the glass more than a radius of the coupling part.

A coupling end of the second mounting member is selectively inserted into a coupling opening formed to the first mounting part.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
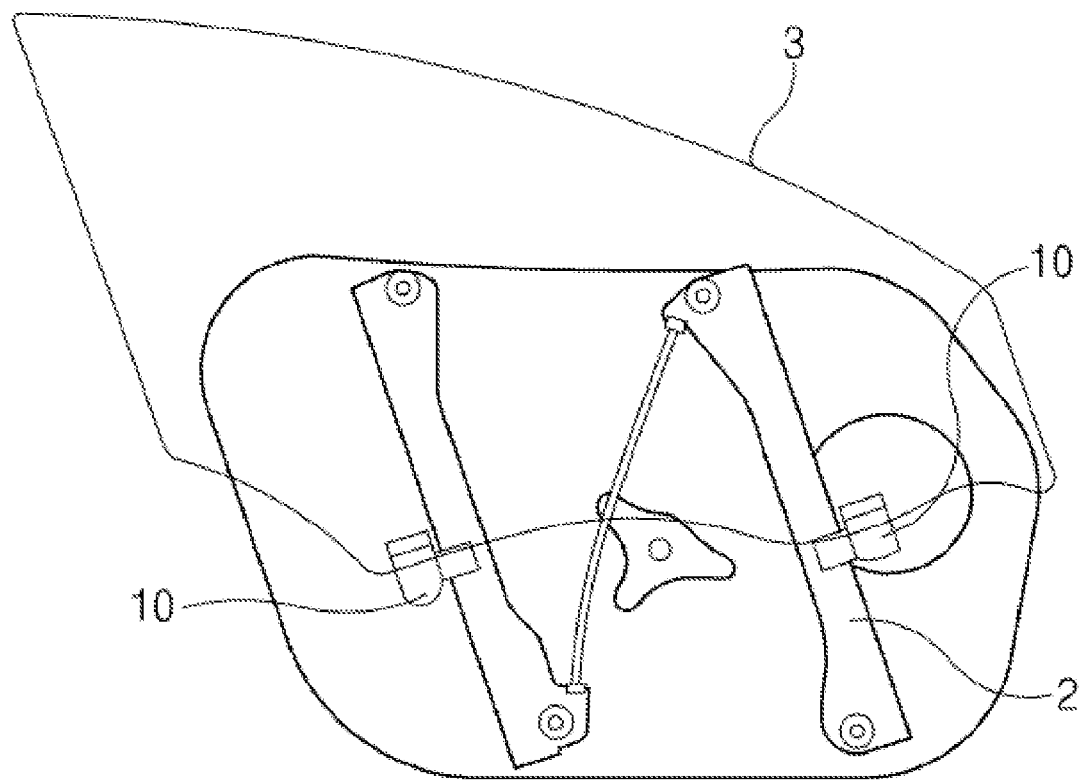
FIG. 1 is a view showing a door glass clamp device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A door glass clamp device according to an exemplary embodiment of the present invention has an improved configuration in which a glass may be mounted only when the glass is horizontally inserted thereinto, to thereby improve a mounting property of the glass and prevent occurrence of an air flow sound.

Figure 2:
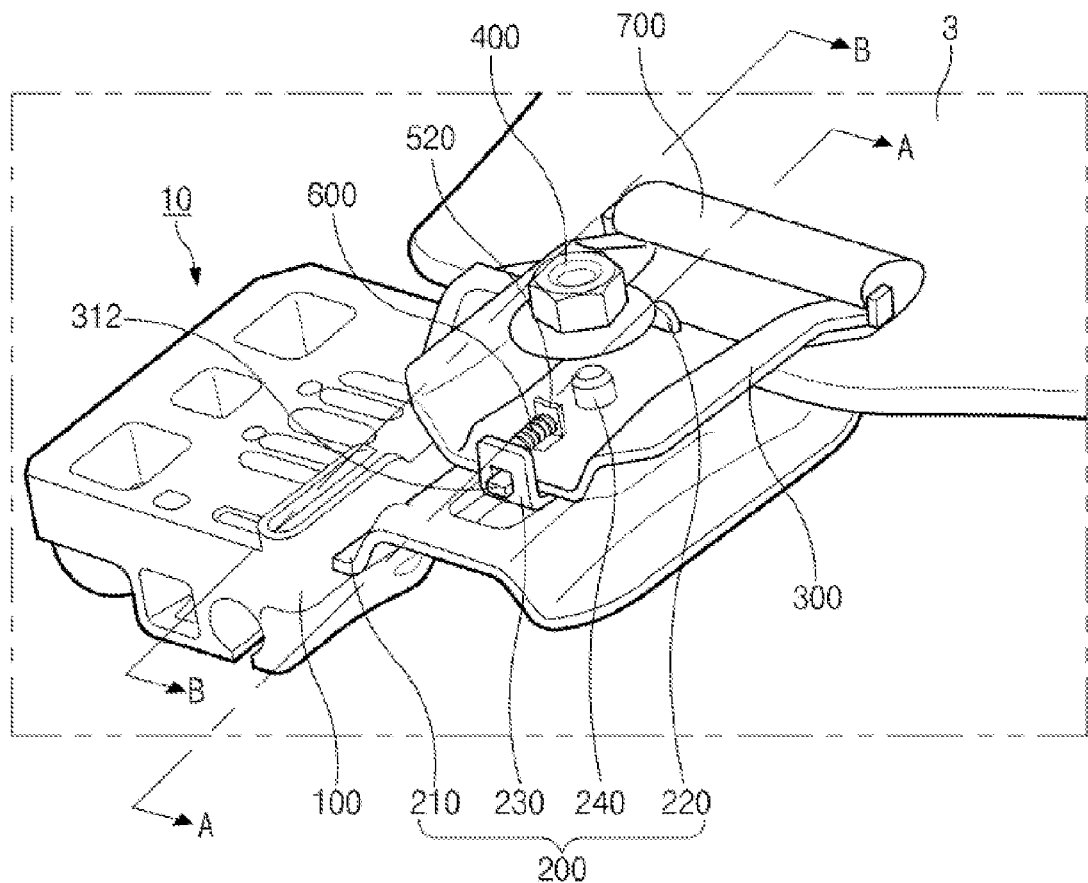
FIG. 2 is an enlarged perspective view showing the door glass clamp device according to an exemplary embodiment of the present invention.
Figure 3:
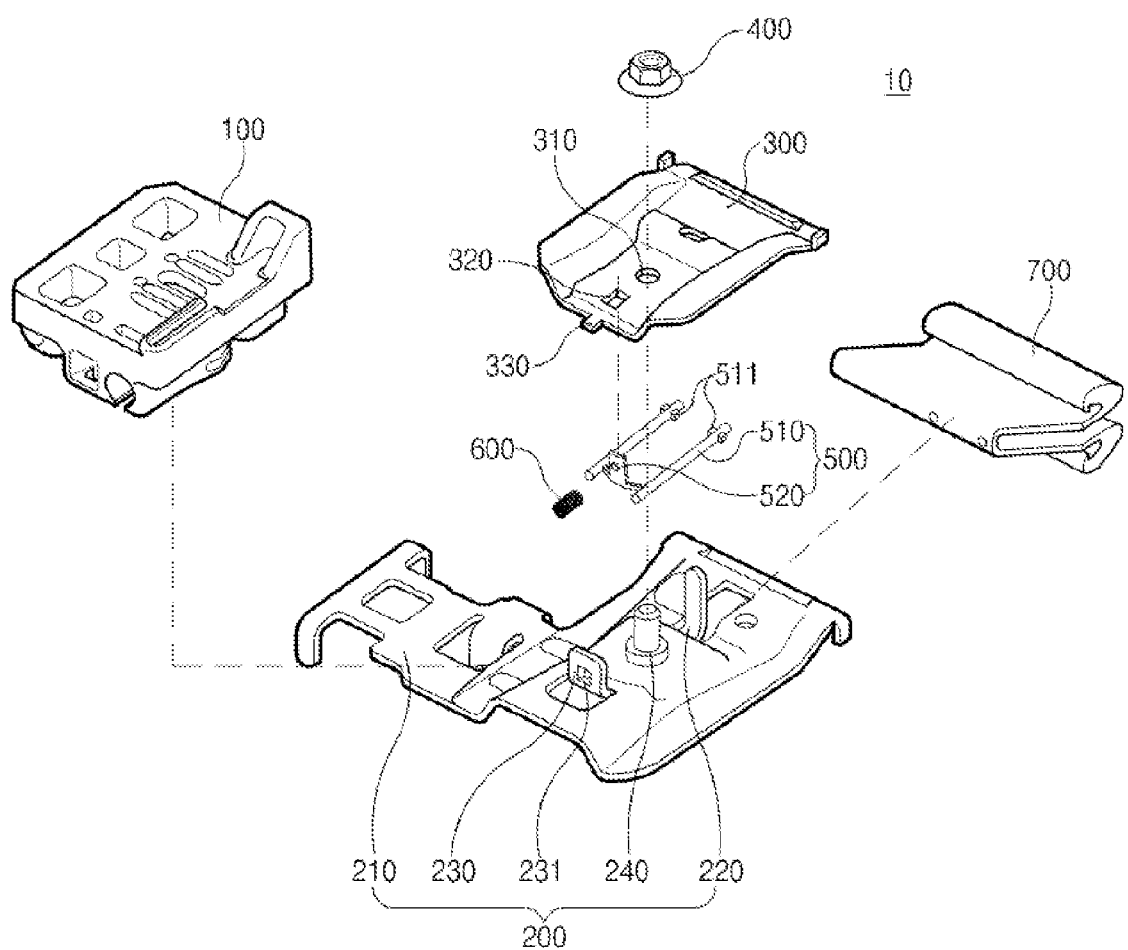
FIG. 3 is an exploded perspective view of the door glass clamp device according to an exemplary embodiment of the present invention.

Referring to FIGS. 1 to 3, the door glass clamp device according to the prevent invention, which ascends or descends a glass 3 along a rail 2 mounted in a door, includes a clamp 100, a first mounting member 200, a second mounting member 300, a nut 400, an adjusting member 500, and an elastic member 600.

The clamp 100 according to an exemplary embodiment of the present invention, which joints the glass 3 to the guide rail 2 installed at the door, has the glass 3 jointed to each of a pair of guide rails 2 provided at both sides of the door and vertically slidably moves the glass 3 along the pair of guide rails 2.

The first mounting member 200 according to an exemplary embodiment of the present invention, which is fixed to the clamp 100, includes a mounting part 210 having the clamp 100 mounted at one side thereof, a catching portion 220 provided at an upper side of the first mounting member 200 and having a lower part of the glass 3 caught and supported thereby, a fixing part 230 provided at a lower side of the first mounting member 200 to support a lower part of the elastic member 600, and a coupled portion 240 provided between the catching portion 220 and the fixing part 230 and having a thread formed thereon.

The second mounting member 300 according to an exemplary embodiment of the present invention is provided with a coupling hole 310 into which the coupled portion 240 of the first mounting member 200 is inserted to thereby support front and rear surfaces of the glass 3, together with the first mounting member 200.

The nut 400 according to an exemplary embodiment of the present invention is jointed to the coupled portion 240 and moves the second mounting member 300 toward the first mounting member 200 to thereby press-fit the glass 3 insertedly supported between the first mounting member 200 and the second mounting member 300.

The adjusting member 500 according to an exemplary embodiment of the present invention, which allows the nut 400 to be coupled to the coupled portion 240 only when the glass 3 is accurately mounted at the first and second mounting parts 200 and 300, is provided between the first mounting member 200 and the second mounting member 300, and includes a pressed part 510 extended to an upper part of the catching portion 220 of the first mounting member 200 to be pressed by the glass 3 and a guide projection 520 protruded from a lower one side of the coupled portion 240 through the guide hole 320 formed in the second mounting member 300 and allowing the nut 400 to be coupled to the coupled portion 240 while downwardly moving so as to be spaced apart from the coupled portion 240 at the time of pressing of the pressed part 510.

Figure 4:
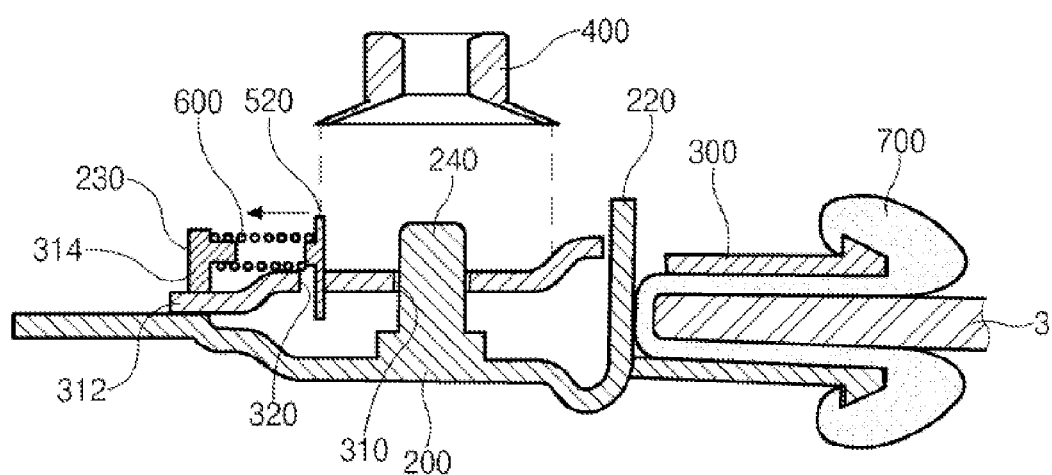
FIG. 4 is a cross-sectional view taken along line A-A of FIG. 2.

That is, as shown in FIG. 4, the adjusting member 500 has the guide projection 520 positioned to be adjacent to a lower part of the coupled portion 240. Therefore, at the time of coupling the nut 400 to the coupled portion 240, the nut 400 is caught by the guide projection 520 to prevent the coupling between the nut 400 and the coupled portion 240.

Figure 5:
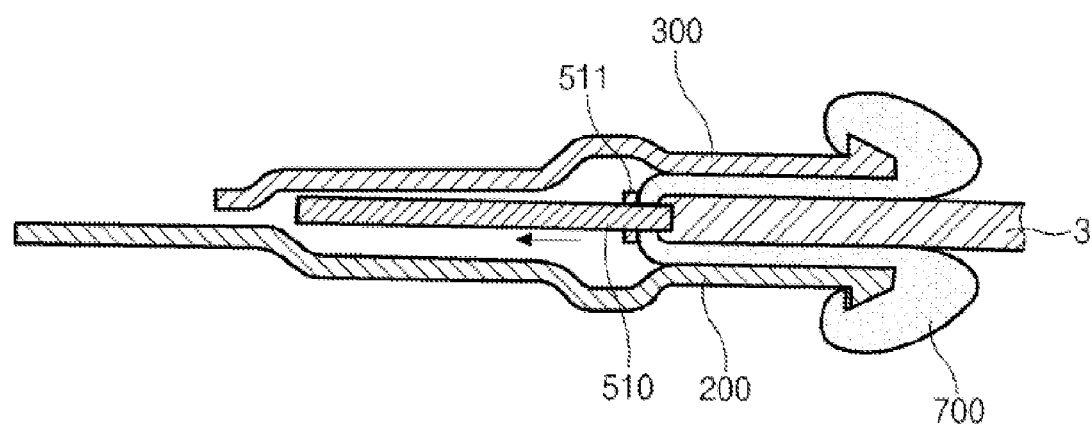
FIG. 5 is a cross-sectional view taken along line B-B of FIG. 2.

Thereafter, as shown in FIG. 5, when the glass 3 presses the pressed part 510, while being accurately inserted between the first mounting member 200 and the second mounting member 300, the guide projection 520 descends to be spaced apart from the coupled portion 240, together with the pressed part 510. Therefore, although the nut 400 is coupled to the coupled portion 240, the nut 400 may be coupled to the coupled portion 240 without being caught by the guide projection 520.

The elastic member 600 according to an exemplary embodiment of the present invention is provided between the guide projection 520 of the adjusting member 500 and the fixing part 230 formed at the first mounting member 200, and elastically supports the guide projection 520 upwardly.

The second mounting member 300 may further include a coupling end 312 and the first mounting member 200 may include a coupling opening 314 into which the coupling end 312 is slidably coupled.

Furthermore, a buffering part 700 for protecting the glass 3 when the first and second mounting parts 200 and 300 are press-fitted is provided between the first mounting member 200 and the second mounting member 300, wherein the buffering part 700 has a 'U' shaped cross section and is made of a synthetic resin having elasticity to thereby fit the glass 3 into an open space formed in an upper surface thereof.

In addition, both side ends of the buffering part 700 are each fitted into upper ends of the first and second mounting parts 200 and 300, thereby preventing movement of the buffering part 700.

Meanwhile, the pressed part 510 of the adjusting member 500 is provided so as to be penetrated from a lower part of the buffering part 700 to an upper part of the buffering part 700 to thereby be pressed by the glass 3 inserted into the buffering part 700, and one side of a lower part of the pressed part 510 is provided with a catching jaw 511 so as to be caught by the lower part of the buffering part 700, thereby limiting a height of the pressed part 510 protruded from an upper surface of the buffering part 700.

Hereinafter, a mounted state of the door glass mounting structure according to an exemplary embodiment of the present invention having the configuration as described above will be described.

The glass 3 is inserted into the buffering part 700 mounted between the first mounting member 200 and the second mounting member 300 each provided at the guide rails of both sides of the door.

In this configuration, when one side of the glass 3 is inserted into the buffering part 700 while being inclined, the glass 3 is inserted into the buffering part 70 in the state in which a lower surface of the glass 3 is spaced apart from a bottom surface of the buffering part 700, to fail to press the pressed part 510 of the adjusting member 500. Therefore, although the nut 400 is intended to be coupled to the coupled portion 240, the guide projection 520 is positioned on the lower surface of the coupled portion 240, thereby blocking the coupling of the nut 400.

As a result, a worker may recognize that the glass 3 is inserted into the buffering part 700 while being inclined, such that the worker may horizontally insert again the glass 3 into the buffering part 700.

Meanwhile, when the glass 3 is horizontally inserted into the buffering part 700, the lower surface of the glass 3 presses the pressed part 510 of the adjusting member 500, such that the guide projection 520 is downwardly moved to be spaced apart from the coupled portion 24. Therefore, the nut 400 is coupled to the coupled portion 240 to press-fit the first and second mounting parts 200 and 300, thereby fixing the glass 3 inserted into the buffering part 700.

According to an exemplary embodiment of the present invention, the door glass clamp device may prevent the assembly badness of the glass to derive the accurate assembly of the glass, thereby preventing the occurrence of the air flow sound after the glass is closed.

In the door glass mounting structure according to an exemplary embodiment of the present invention, the nut may not be coupled to the coupled portion 240 when the glass 3 is inserted while being inclined, and the glass may be accurately inserted again by simply determining whether the glass is inserted while being inclined, thereby making it possible to improve the efficiency of the work and prevent the occurrence of the air flow sound.

According to an exemplary embodiment of the present invention, the door glass clamp device may prevent the assembly badness of the glass to derive the accurate assembly of the glass, thereby preventing the occurrence of the air flow sound after the glass is closed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A door glass clamp device comprising:
   clamps jointed to each of a pair of guide rails installed at first and second sides of a door;
   a first mounting member mounted to each of the clamps and provided with a coupled portion wherein the first mounting member is configured for supporting a lower part of a glass;
   a second mounting member engaged to the coupled portion of the first mounting member and supporting the lower part of the glass together with the first mounting member;
   a coupling member selectively coupled to the coupled portion protruding through the second mounting member and configured for moving the second mounting member engaged to the coupled portion toward the first mounting member while the coupling member moves along the coupled portion; and
   an adjusting member slidably provided between the first mounting member and the second mounting member to be moved therebetween, the adjusting member controlling the coupling member to be coupled or not to be coupled to the second mounting member;
   wherein the adjusting member includes:
      a pressed part extended beyond a catching portion of the first mounting member to be pressed by the glass; and
      a guide projection connected to the pressed part and elastically biased toward the coupled portion by an elastic member, such that the guide projection blocks a movement of the coupling member toward the second mounting member while the pressed part is not pressed by the glass; and
   wherein the elastic member is provided between the guide projection of the adjusting member and a fixing part formed at the first mounting member.

2. The door glass clamp device of claim 1, wherein the coupling member is a nut.

3. The door glass clamp device of claim 1, wherein the guide projection is protruded at a lower one side of the coupled portion through a guide hole formed in the second mounting member and allows the coupling member to be coupled to the second mounting member when the guide projection moves away from the coupled portion in a predetermined distance by the pressed part so as to make the guide projection spaced away from the coupled portion when the pressed part of the adjusting member is pressed by the glass in the predetermined distance.

4. The door glass clamp device of claim 1, wherein the first mounting member includes:
   a mounting part mounted at each of the clamps;
   a catching portion supporting the lower part of the glass; and
   the coupled portion having a thread formed thereon, and
   wherein the second mounting member includes:
      a coupling hole into which the coupled portion of the first mounting member is inserted so that the first mounting member supports front and rear surfaces of the glass together with the second mounting part.

5. The door glass clamp device of claim 1, wherein the lower part of the glass insertedly supported between the first mounting member and the second mounting member with a buffering part.

6. The door glass clamp device of claim 5, wherein a pressed part of the adjusting member is protruded through a lower part of the buffering part and selectively pressed by the glass inserted into the buffering part.

7. The door glass clamp device of claim 6, wherein an upper side of the pressed part of the adjusting member is provided with a catching jaw to be caught by the lower part of the buffering part when the lower part of the buffering part is pressed by the glass more than a radius of the coupling part.

8. The door glass clamp device of claim 1, wherein a coupling end of the second mounting member is selectively inserted into a coupling opening formed in the first mounting member.

* * * * *